United States Patent Office 3,191,216
Patented June 29, 1965

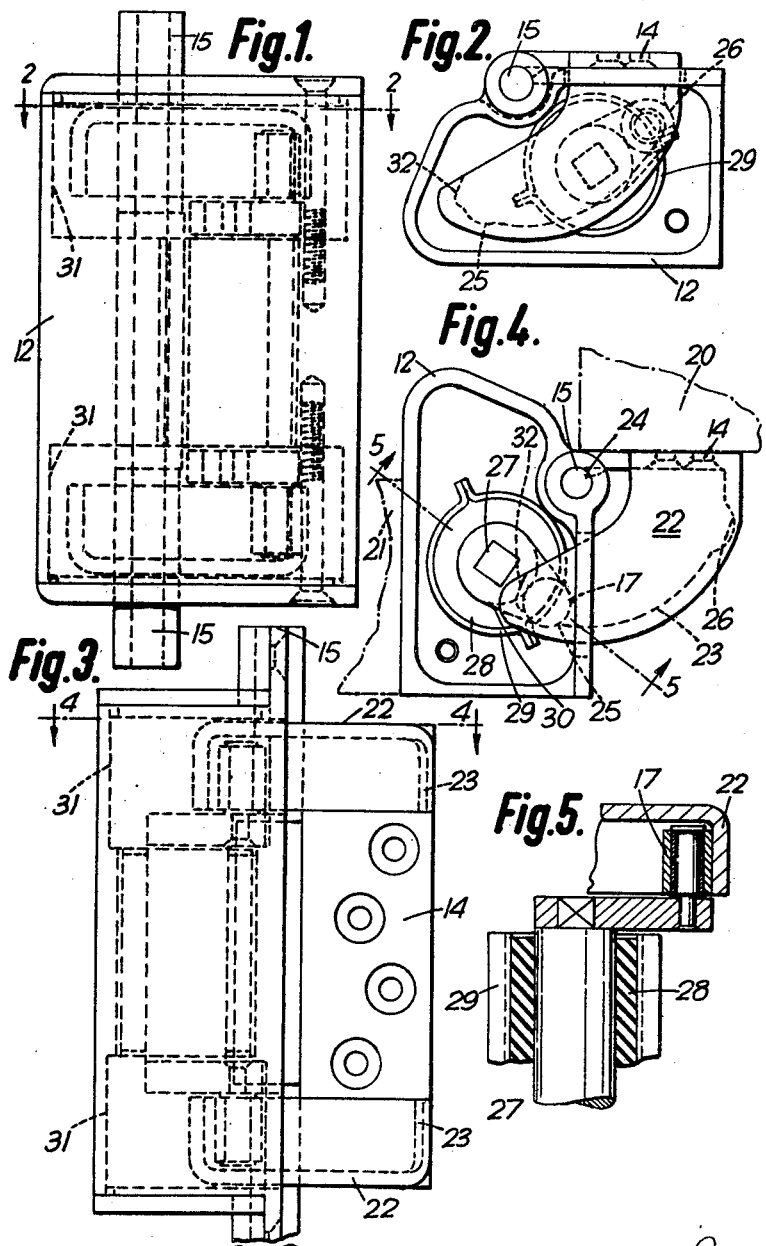

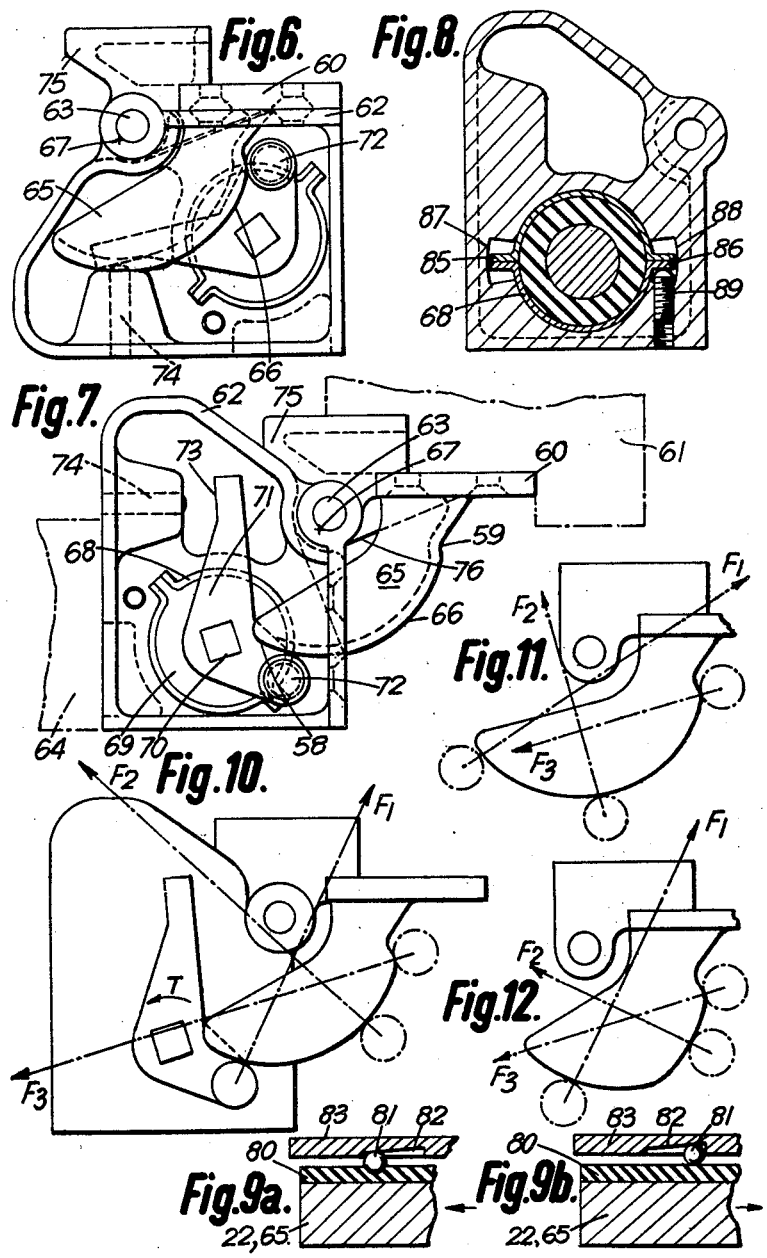

3,191,216
HINGES
Peter Frederick Hufton, Rolleston-on-Dove, and William Robert Brake, Burton-on-Trent, England, assignors to BTR Industries Limited, London, England, a British company
Filed Mar. 13, 1963, Ser. No. 264,910
Claims priority, application Great Britain, Mar. 14, 1962, 9,884/62
9 Claims. (Cl. 16—141)

The invention relates to hinges and particularly to hinges which are self closing. The term "closing" is herein used to indicate movement of the hinge in a desired direction—e.g. in a house door which has a butt hinge the door is "closed" when the hinge plates are together, in a gate the gate is "closed" when the plates are wide apart and in a fire door which is held closed by a safety catch the desired direction of movement by the hinge is such as to open the door.

The invention provides a hinge having two hinge plates hinged together, a cam on one plate with a cam surface at varying distances from the hinge axis, a resilient member capable of resilient strain between two parts thereof, one part being attached to the other hinge plate, and a cam follower on the other part arranged to run on the cam surface, the arrangement being that hinging movement in one sense strains the resilient member.

The invention also provides a hinge having two hinge plates hinged together, a resilient member capable of resilient strain between two parts thereof, one part being attached to one hinge plate and a cam surface on the other part, the cam surface being at varying distances from the hinge axis, and a cam follower attached to the other hinge plate arranged to run on the cam surface, the arrangement being such that hinging movement in one sense strains the resilient member.

It is preferred that the resilient member is connected between a first member and a second member arranged for rotation around the first member, the resilient member being arranged to resist such rotation in either sense, the first member being attached to the hinge plate and the second member being attached to the cam or cam follower.

In one embodiment the second member is a sleeve around the first member and the resilient member is housed between the first and second members. The relative rotation may be by an angular amount less than that through which the plates have hinged.

In one form of the invention the resilient member comprises a bush or sleeve or equivalent assembly of elastomeric material.

The follower may be in the form of an arm attached to the first member and preferably there are two such cam followers and arms, one at each end of the first member, which arms engage two identical cam surfaces.

The distance between the cam surface and the hinge axis may increase as the distance of the cam surface away from the plate to which the cam surface is appropriated increases. More specifically the cam surface may be defined by arcs of circles of which the centers are offset from the hinge axis.

The hinge may be so arranged that a relatively large angle of relative rotation of the hinge plates is accompanied by a relatively small angle of relative rotation of the first and second members.

There may be means to disconnect temporarily the resilient member from the cam or the cam surface e.g. so that the hinge and a door may be installed in a door frame, and there may also be snubbing means to reduce noise as the hinge plates finally close.

Two specific examples of constructions according to the invention and modifications thereof will now be described with reference to the accompanying drawings in which:

FIGURE 1 shows the hinge of one construction in the closed position,
FIGURE 2 is a section on the line 2—2 in FIGURE 1,
FIGURE 3 shows the hinge in the open position,
FIGURE 4 is a section on the line 4—4 in FIGURE 3,
FIGURE 5 is an enlarged section of the spring unit and torque arm assembly on the line 5—5 in FIGURE 4,
FIGURE 6 is a view similar to FIGURE 2 of a modified hinge,
FIGURE 7 is a view similar to FIGURE 4 of the modified hinge,
FIGURE 8 is a section through the housing showing a modified way of attaching the spring unit to the housing,
FIGURES 9a and 9b show one form of snubbing means,
FIGURE 10 is a diagrammatic view of the hinge shown in FIGURES 6 and 7 showing the directions of forces acting on the cam surface, and
FIGURES 11 and 12 are views corresponding to FIGURE 10 of modified hinges.

Referring first to the construction shown in FIGURES 1–5 and as can be best seen from FIGURE 4, the hinge comprises two main assemblies, a first hinge plate 14 which is attached to the door jamb 20 and a second hinge plate or housing 12 which is attached to the door 21 and is pivoted to the hinge plate 14 by a pin 15.

The hinge plate 14 carries two cam plates 22 each with a cam surface 23 which is part of a circle with its centre at 24. There are two arcuate depressions 25, 26 in the cam surface and of which the function will be described later. This arrangement of the cam surface ensures that the distance of the cam surface from the pin 15 varies continuously around the cam surface.

The housing 12 carries a spring unit which comprises a central pin 27, a rubber bush 28 bonded to the pin 27, and an outer casing or sleeve 29 which is fixed relative to the housing and bonded to the bush 28.

At each end the pin 27 carries a torsion arm 30 which has a roller or cam follower 17 pivoted thereto.

The housing has two rectangular openings 31 which allow the cam plates 22 to enter the housing and the rollers 17 to engage the cam surfaces 23.

The action of the hinge is such that, as the housing 12 rotates relative to the door jamb 20 about the pin 15 the rollers 17 move along cam surfaces 23. As the distance of the cam surfaces from the pin 15 varies as the rollers move around the cam surfaces the torque arms 30 are rotated relative to the housing during the said movement. Thus, if there is no loading of the spring unit formed by the pin 27, the bush 28 and the casing 29 when the hinge is in the closed position, the spring unit will be given a loading which increases with the angle of opening of the hinge, i.e. the more the hinge opens, the greater the load. Within given limits in fact, the hinge cannot be opened beyond a point marked by abutments 32 at the ends of the cam surfaces. The loading of the spring unit is, therefore, always in the sense to return the hinge to its closed position.

The depressions 25, 26 serve as stops for the rollers so that the hinge will remain open and will close firmly respectively at the two extreme positions.

The depressions do not interfere with the tendency of the hinge to close when left at an intermediate position.

The hinge is rendered more effective if a small initial loading is given to the spring.

It is a feature of this example that the torque arms 30 only rotate through 20° relative to the casing 29 while the hinge opens through 90°.

The modified form of the hinge shown in FIGURES 6 and 7 operates on exactly the same principle as the hinge just described but the construction is modified in one or two respects.

A first hinge plate 60 is attached to a door jamb 61 and a second hinge plate or housing 62, hinged at 63 to the hinge plate 60, is attached to a door 64.

The first hinge plate 60 carries two cam plates 65 each providing a cam track 66 which is an arc of a circle having its centre at the point 67. There is a detent 59 at the end of the cam nearer the plate 60 and a radius run-off 58 at the other end of the cam.

The housing 62 carries a spring unit comprising an outer casing or sleeve 68 fixed to the housing, a rubber bush 69 bonded externally to the sleeve 68, and a central pin bonded to the inside of the bush and having keyed ends 70.

Keyed to each end 70 of the pin there is a torsion arm 71 and at one end of each torsion arm there is a cam follower or roller 72 which runs on its respective cam track 66. The other end of one torsion arm is extended beyond the end 70 and provides an abutment 73. A screw (not shown) fits into a hole 74 in the housing 62 and engages the abutment 73. The screw can be screwed into the hole 74 to move the abutment to the right pushing the cam follower 72 out of engagement with the cam 66. This is particularly useful when the hinge is not required to be spring loaded, e.g. during initial installation of the hinge.

There is a stop 75 attached to the plate 60 and the stop 75 engages the housing 62 to prevent the hinge plates from opening by more than 90°.

There are strengthening ribs 76 between the plate 60 and the hinge pin.

In operation the torque arm rotates anticlockwise as the plates close together and vice versa. It will be appreciated that the relative rotation of the pin and the sleeve 68 is much less than that of the hinge plates. When the plates are together the roller 72 lies in the detent 59 to hold the plates firmly closed. Opening of the plates strains the sleeve 69 with the result that the plates always tend to close together. The radius run-off 58 allows the door to remain in the "fully open" position.

It may be desirable to have an initial loading of the spring unit to hold the hinge plates firmly closed together. FIGURE 8 shows one way in which the spring unit can be fixed to the housing so that the initial loading can be varied.

The outer sleeve 68 is mounted for rotation in the housing and has two lugs 85, 86 which are arranged for limited movement in slots 87, 88 in the housing. The sleeve 68 can be rotated by means of a grub screw 89.

FIGURE 10 shows the directions of the forces $F_1$, $F_2$ and $F_3$ acting on the cam track at different degrees of opening of the hinge. The forces on the door will be equal and opposite.

The scope of the invention is not restricted to the specific embodiments described above. For example the spring unit could be arranged to be coaxial or integral with the hinge. Further it is not essential that the axis of the spring unit is vertical—it could be horizontal and the follower could be arranged to run along a generally horizontal cam track.

The hinges described above may be modified further by replacing the rubber sleeve 28 or 69 by a spiral spring.

It may be desirable to fit either of the hinges described with snubbing means to reduce noise on closure. The snubbing means may take various forms, one of which is shown in FIGURES 9a and 9b.

A rubber pad 80 may be formed on top of the cam plate 22 or 65 and a ball or roller 81 may be located in a tapered slot 82 in a member 83 attached to the housing 12 or 62. FIGURE 9a shows the position of the ball or roller 81 as the hinge is closing and FIGURE 9b shows the position when the hinge is opening. It will be seen that the ball 81 only engages the pad 80 when the hinge closes.

Alternatively there may be a snubbing block of elastomeric material fitted to one of the hinge plates, the block being arranged to contact the other hinge plate just before complete closure of the plates.

Alternatively the cam follower may be equipped with a blade of elastomeric material to act as a further damper, or there may be an hydraulic or pneumatic damper located in the housing.

Although the hinge has been described as opening through 90° it could be arranged to open through any angle—FIGURE 11 shows the directions of forces $F_1$, $F_2$, $F_3$ on the cam plate at different degrees of opening of a hinge which opens through 120°.

Another modification is to arrange the cam plate so that the hinge tends to close over the first part of its movement and to open over the second part. FIGURE 12 shows a cam plate where the said first and second parts are each 45°, and shows forces $F_1$, $F_2$ and $F_3$ acting on the cam plate at different positions of opening.

We claim:
1. A hinge unit having:
 (a) two hinge plates hinged together for movement between open and closed positions;
 (b) a curved cam surface on one plate;
 (c) an arm pivotally attached to the other plate;
 (d) a cam follower on the arm and arranged to engage the cam surface;
 (e) spring means acting between the arm and the other plate to urge the cam follower into engagement with the cam surface;
 (f) the cam follower moving along the cam surface between the end portions thereof during movement as aforesaid;
 (g) the cam surface being shaped such that the distance between the hinge axis and the surface varies progressively whereby during the aforesaid movement of the plates in either direction the tension of the spring means is progressively changed.

2. A hinge unit as claimed in claim 1 in which the spring means comprises a rubber sleeve, a first member bonded to the inside of the sleeve and a second member bonded to the outside of the sleeve for relative rotation around the first member, one member being attached to the arm and the other member being attached to said other plate.

3. A hinge unit as claimed in claim 1 having means to move the cam follower temporarily out of engagement with the cam surface whereby the hinge plates are temporarily free for relative hinging movement.

4. A hinge unit as claimed in claim 1 in which there is means provided at one end of the cam surface for arresting the cam follower when the hinge is in an open position.

5. A hinge unit as claimed in claim 4 in which there is a depression at the other end of the cam surface to be engaged by the follower near the closed position of the hinge so that the hinge closes firmly.

6. A hinge unit as claimed in claim 1 having a cam surface which is shaped to slope progressively to a high point intermediate between the end portions as the distance along the surface from each end increases whereby during the aforesaid movement of the plates in either direction the spring means is first tensioned progressively and then released progressively.

7. A hinge unit as claimed in claim 1 wherein the cam surface is arranged to face away from the hinge axis and is shaped to extend progressively further from the hinge axis as the distance along the surface from the end portion with which the cam follower is in contact at the closed position increases whereby during the aforesaid movement of the plates from closed to open position the spring means is progressively tensioned.

8. A hinge unit as claimed in claim 1 wherein the cam surface is arranged to face towards the hinge axis and is shaped to extend progressively closer to the hinge axis as the distance along the surface from the end portion with which the cam follower is in contact at the closed position increases whereby during the aforesaid movement of the plates from the closed to open position the spring means is progressively tensioned.

9. A hinge unit as claimed in claim 1 in which the cam surface is defined by the arc of a circle of which the center is offset from the hinge axis.

References Cited by the Examiner

UNITED STATES PATENTS

| 2,709,275 | 5/55 | Johnson | 16—191 X |
| 3,065,497 | 11/62 | Faber | 16—142 |

DONLEY J. STOCKING, *Primary Examiner.*